United States Patent Office 3,102,147
Patented Aug. 27, 1963

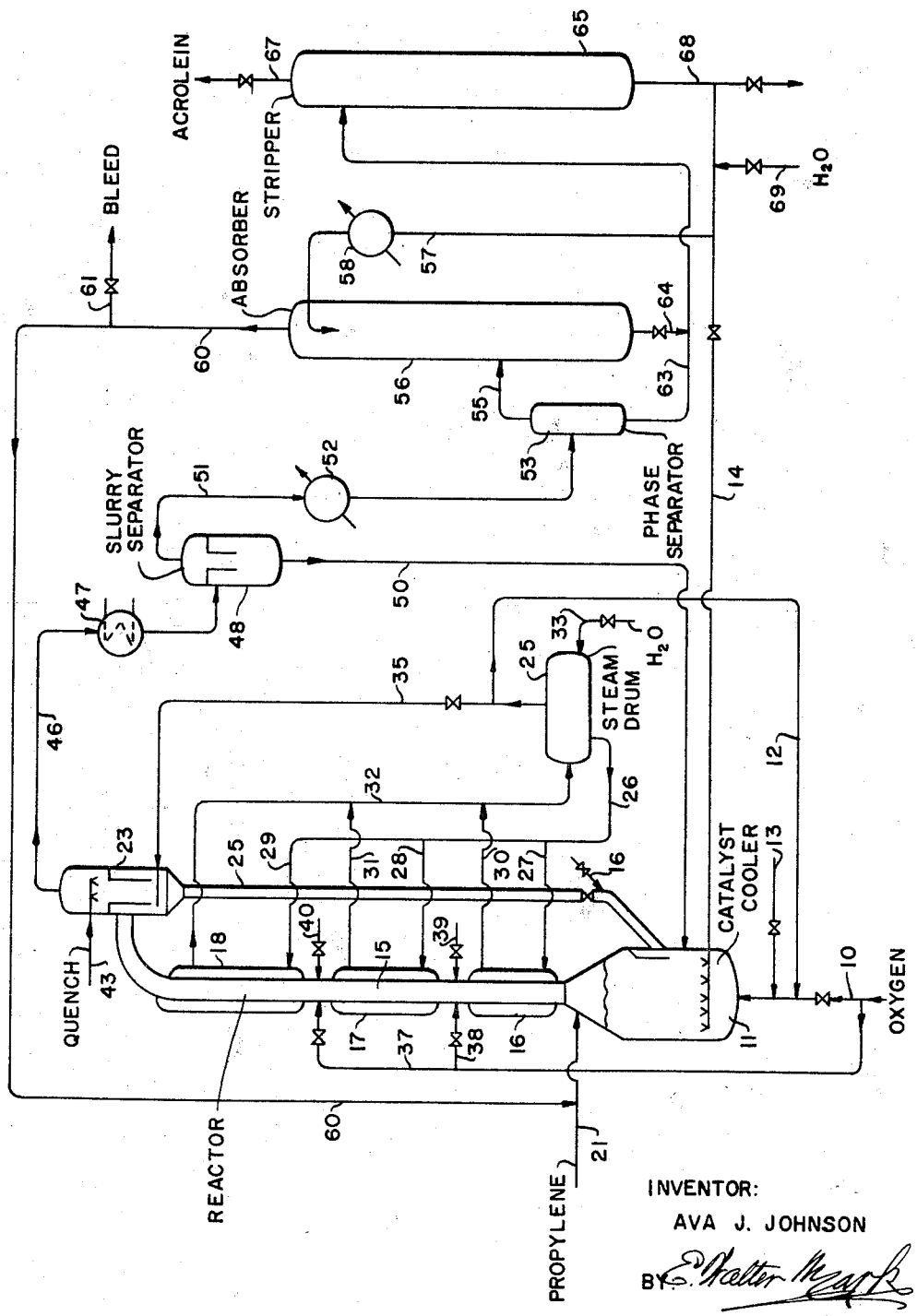

3,102,147
OXIDATION OF OLEFINS TO UNSATURATED
ALDEHYDES AND KETONES
Ava J. Johnson, Piedmont, Calif., assignor to Shell Oil
Company, a corporation of Delaware
Filed Nov. 2, 1959, Ser. No. 850,477
5 Claims. (Cl. 260—604)

This invention relates to the production of alpha,beta-unsaturated aldehydes and ketones by the catalytic oxidation of the corresponding olefinic hydrocarbons. The invention relates more particularly to improvements in the production of acrolein and methacrolein by the catalytic oxidation of propylene and isobutylene, respectively.

It is known that with the aid of certain catalysts the oxidation of olefinic hydrocarbons with molecular oxygen can be controlled to yield reaction products comprising alpha,beta-unsaturated aldehydes and ketones. Such catalysts are not always equally effective, however, and their ability to function as catalysts for the reaction often varies greatly with variations in the conditions under which they are employed. Catalysts comprising cuprous oxide have been found to be effective in catalyzing the controlled oxidation of olefins to alpha,beta-unsaturated carbonylic compounds at conditions rendering them particularly suitable for carrying out the reaction in commercial scale operations wherein the catalysts are used in the form of a fixed or fluidized bed. Materials other than cuprous oxide, for example certain heavy metal-containing oxidation catalysts comprising certain combinations of a heavy metal with at least one other compound, have been found to assert a favorable influence upon the oxidation of olefins to the corresponding unsaturated carbonylic compounds. Application of such catalysts to the large scale production of alpha-beta-unsaturated carbonylic compounds, from the corresponding olefins under conditions disclosed heretofore, is however, generally difficult and often impractical. The conditions under which certain of these catalysts assert their effect to a sufficiently marked degree are often such as to preclude their efficient use in large scale processes of the type disclosed heretofore. Relatively elevated temperatures at which many of these oxidation catalysts must be employed present serious problems with respect to the maintenance of operating conditions yielding a product distribution commensurate with commercial operations. These difficulties are greatly aggravated as a consequence of the highly exothermic nature of the incomplete oxidation reaction, and the relative instability of the desired unsaturated products, particularly at elevated temperatures. The unduly high capital and operating costs generally involved in maintaining the controlled high temperature conditions with the use of these catalysts in either a dense fluidized or fixed bed of operation militates against large scale operation of the process. A potential advantage attributable to characteristics of certain of the heavy metal-containing oxidation catalysts is the ability to provide conditions conducive to high production rates of the desired unsaturated compounds. However, such object is generally not attainable in practical scale operations of the processes available heretofore with the aid of such catalysts because of the inability to supply to the reaction zone the necessary relative large amounts of the oxygen reactant under conditions enabling its proper utilization.

It is therefore an object of the present invention to provide an improved process enabling the more efficient production of alpha,beta-unsaturated aliphatic aldehydes and ketones from corresponding olefinic hydrocarbons with the aid of heavy metal-containing catalysts wherein the above difficulties are obviated to at least a substantial degree.

Another object of the invention is the provision of an improved process enabling the more efficient controlled oxidation of olefinic hydrocarbons with molecular oxygen in the presence of heavy metal-containing oxidation catalysts wherein a relatively high ratio of oxygen to hydrocarbon charge is introduced into the reaction zone under conditions enabling the obtaining of a high production rate of desired unsaturated carbonylic compounds.

A still further object of the invention is the provision of an improved process enabling the more efficient production of alpha,beta-unsaturated aldehydes and ketones by the catalytic oxidation of the corresponding olefins in the presence of a heavy metal-containing oxidation catalyst under conditions providing substantially improved utilization of the exothermic heat of reaction produced within the system.

Still another object of the invention is the provision of an improved process enabling the more efficient controlled oxidation of propylene and isobutylene to acrolein and methacrolein, respectively, with the aid of a heavy metal-containing catalyst.

A particular object of the invention is the provision of an improved process enabling the more efficient production of acrolein at substantially increased production rates by the controlled catalytic oxidation of propylene with molecular oxygen in the presence of a heavy metal-containing oxidation catalyst. Other objects and advantages of the invention will become apparent from the following detailed description thereof made with reference to the attached drawing forming a part of the present specification and wherein the single figure represents a more or less diagrammatic elevational view of one form of apparatus suitable for carrying out the invention.

In accordance with the invention alpha,beta-unsaturated aliphatic aldehydes and ketones are produced by passing an olefinic hydrocarbon and a suspension of a heavy metal-containing oxidation catalyst in an oxygen-containing gas comprising both molecular oxygen and steam, emanating from within the system, concurrently through an elongated reaction zone of restricted cross-sectional area at a space velocity assuring the maintenance of the catalyst in the suspended state throughout the reaction zone, at alpha,beta-unsaturated aldehyde and ketone producing conditions of temperature, while injecting molecular oxygen gas into the reaction zone at a plurality of points along the length thereof. Reaction products, comprising alpha,beta-unsaturated aldehydes and ketones, and catalyst are separated from the effluence from the reaction zone; catalyst separated from the reactor effluence is passed into a catalyst cooling zone which is in open communication with the elongated reaction zone and wherein the catalyst is cooled by direct contact with water thereby generating steam; a molecular oxygen-containing gas is passed through the catalyst in the catalyst cooling zone; the mixture of molecular oxygen-containing gas and steam will pick up catalyst in the catalyst cooling zone thereby forming said suspension of molecular oxygen-containing gas and steam which is passed concurrently with said added olefinic hydrocarbon through the reaction zone. In a preferred method of carrying out the process of the invention reactor walls are cooled by indirect contact with water and the resulting steam used to steam-strip catalyst leaving the reaction zone.

Olefinic hydrocarbons converted to the corresponding alpha,beta-unsaturated aliphatic aldehydes and ketones in accordance with the invention comprise broadly olefins having three or more carbon atoms to the molecule. By the term "olefin" as used herein and in the appended claims is meant the open chain as well as the cyclic olefins. Comprised in the suitable olefins used as starting materials are: propylene, isobutylene, 3-methyl-butene-1, 2-methyl-butene-2, cyclopentene, cyclohexene, 3-methyl-cyclohexene, etc. These compounds and their various homologues and analogues may be substituted in the nucleus and/or in the substituents in various degrees by straight chain alicyclic and/or heterocyclic radicals. The charge to the process of the invention may comprise a mixture of two or more of such olefins. Particularly suitable charge materials comprise the hydrocarbon fractions containing one or more of these olefins in combination with saturated hydrocarbons. Saturated hydrocarbons, it has been found, generally do not enter into reaction to any substantial degree and do not adversely affect the course of the desired reaction.

Molecular oxygen reacted with the olefin charge to the system may be obtained from any suitable source. The molecular oxygen employed as reactant may be introduced into the system as relatively pure oxygen or as a mixture of oxygen with gaseous diluents such as, for example, nitrogen, oxides of carbon, paraffinic hydrocarbons, etc. Although air may be used as the molecular-oxygen-containing charge to the process of the invention, a particular advantage of the invention resides in the ability to use concentrated oxygen efficiently. As a consequence of the catalyst cooling by direct contact with water in a zone preceding the reaction zone there is generated within the system an adequate supply of steam essential to the carrying of the catalyst through the reaction zone in suspended state. The need to rely upon the inert gaseous components of diluted oxygen charge, such as air, is consequently dispensed with. The use of the steam generated within the system to aid in carrying the catalyst through the system greatly reduces the size, and consequently cost, of equipment involved in executing the reaction and in recovering products therefrom. The generation of steam by direct heat exchange with the catalyst within the system as carried out herein provides means which not only dispense with the need of steam production for such purpose outside of the system, but which enables such required steam to be produced with a minimum of equipment. The molecular oxygen may be charged to the system in a molar ratio of oxygen to olefinic charge of from about 0.3 to 1 to about 10 to 1. A relatively high ratio of oxygen charge to hydrocarbon charge is preferably maintained. It is preferred to maintain the molar ratio of oxygen charge to olefin charge to the system in excess of about 1:1, for example, in the range of from about 1:1 to about 2:1. Relatively high total oxygen utilization, with consequent increase in product production rate, is made possible by injecting oxygen from an outside source into the reaction zone at a plurality of points along the length thereof.

The reaction zone is maintained at a temperature in the range of from about 250° to about 750° C. Generally the use of a temperature in excess of 370° C. is preferred. It is found that a temperature in excess of about 600° C. need generally not be exceeded. The specific temperature preferably employed may vary in accordance with the specific olefin charged to the system and the specific catalyst employed. The reaction zone is maintained at the desired reaction temperature by removing heat from the catalyst by direct contact with water, by controlling the temperature of the reactants introduced, and by cooling the reactor walls; the exothermic heat of reaction produced in the system providing the necessary heat to carry on the process once the reaction has been initiated.

The reaction is carried out at a pressure in the range of from slightly above atmospheric to about 750 p.s.i.g. In general, the pressure employed is essentially that required to provide the necessary pressure differential enabling efficient flow of reactants and catalyst through the system. It will be found that a pressure above about 500 p.s.i.g. need generally not be exceeded. Generally a pressure of from about 50 to about 150 p.s.i.g. will be found to be satisfactory.

Catalysts employed in the process of the invention comprise broadly heavy metal-containing catalysts disclosed heretofore as being capable of catalyzing the oxidation of olefinic hydrocarbons to unsaturated aliphatic aldehydes and ketones. These comprise, for example, certain oxidation catalysts containing at least one heavy metal in combination with oxygen. The heavy metal compound of the catalyst may be present therein as a single oxide, a salt, a heteropoly acid, a metallate, or the like. Specific non-limiting examples of suitable catalysts comprise: tellurium oxide; tellurium oxide in combination with an oxide of a group VI metal such as molybdenum, tungsten and uranium; copper oxide in combination with a metal of the paladium-platinum group or with group VIII elements of the fourth series; metal selenites and tellarites wherein the metal component may be Ag, Pb, Fe, Co, Ni, Cd, etc. Still other examples of suitable catalysts comprise copper in combination with silica gel containing in addition a member of the group consisting of Cd, Co, Mo, Th, Mn, Ca, Ti, Th, etc. Other catalysts which have been indicated to be applicable to controlled incomplete olefin oxidation include selenium in combination with a metal oxide selected from the group consisting of Cu, Vn, Te, Cr, Mo, W, U, Sn, and combinations of selenium with copper aluminate silicate etc. These catalysts may be employed as such or supported on suitable catalyst supports such as for example, the siliceous and aluminous catalyst supports including silica gel, the various aluminas, silicon carbide, pumice, etc.

Although the process of the invention lends itself broadly to the use of available heavy metal-containing oxidation catalysts known to catalyze the oxidation of olefins to alpha,beta-unsatured carbonylic compounds, it is carried out with particular advantage with catalysts containing an oxide of molybdenum as a component thereof. Such catalysts comprise combinations of oxides of molybdenum with compounds of bismuth such as, for example, bismuth molybdate. Particularly suitable catalysts comprise those consisting essentially of molybdenum, bismuth and oxygen, and optionally a suitable catalyst support or solid inert diluent therefor. Such catalysts include those containing oxides of molybdenum and of bismuth in either physical and/or chemical combination. The suitable catalysts comprise combinations of oxides of molybdenum and bismuth further modified by the addition of phosphorous or compounds of phosphorous thereto, for example, bismuth phosphomolybdate optionally in combination with a suitable aluminous or siliceous catalyst support material.

Essential to the attainment of the objects of the invention is the use of the catalysts in the form of a suspension in the reaction mixture. The suspension of the catalyst is obtained by passing a stream of molecular oxygen-containing gas from an outside source, through a bed of hot catalyst while simultaneously introducing water into the hot catalyst bed thereby generating steam and forming a stream containing entrained catalyst suspended in a mixture of steam and molecular oxygen-containing gas. It is to this suspension that the olefinic charge to the system is added and the entire mixture is thereupon passed through the elongated reaction zone. Conditions within the reaction zone are controlled to maintain the catalyst therein in the suspended state. This is accomplished by judicious control of the pressure differential maintained across the reaction zone, and by control of the rate of introduction of oxygen-containing gas and water into the bed of catalyst.

In order that the invention may be more readily understood it will be described hereinafter with reference to the attached drawing as applied to the production of acrolein by the controlled catalytic oxidation of propylene with molecular oxygen.

Referring to the drawing, an oxygen-containing gas, for example, oxygen of 95% purity obtained by the fractionation of air, is forced through valved line 10 into a catalyst-containing zone of relatively large cross-sectional area, for example, chamber 11. Chamber 11 contains a bed of heavy metal-containing oxidation catalyst capable of promoting the oxidation of propylene to acrolein, preferably an oxygen-containing compound of molybdenum, for example, bismuth molybdate, a bismuthphosphomolybdate, or the like, optionally combined with a suitable catalyst support material, preferably of siliceous or aluminous character. The catalyst in chamber 11, emanating from the reaction zone as described herein below, will be at elevated temperature.

The reaction system is generally brought up to reaction temperature before initiating the oxidation reaction therein. Thus, the system may be brought to initial reaction conditions by the passage of hot gas therethrough, preferably in the manner disclosed and claimed in copending application Serial No. 850,239, filed Nov. 2, 1959, and now abandoned.

Aqueous streams, emanating at least in part from within the system through lines 14 and 50, are also forced into chamber 11. In contacting the hot catalyst in chamber 11 the water is converted to steam. In passing through the catalyst bed in chamber 11 the gaseous streams comprising molecular oxygen and steam generated therein maintain the catalyst in a fluidized dense bed while forming a gaseous effluence from chamber 11 comprising steam, molecular oxygen and entrained catalyst.

Chamber 11 is in open communication with an elongated reaction zone of restricted cross-sectional area such as, for example, a tube, pipe, cylinder, or the like; for example, a tubular reactor 15, provided with cooling jackets 16, 17, and 18. Reactor 15 discharges into a catalyst separating zone, for example, a cyclone 23. Reactor 15 is of the type sometimes referred to in the industry as a "riser" reactor.

Gaseous effluence from chamber 11, comprising steam, molecular oxygen and entrained catalyst, is passed upwardly through reactor 15. The catalyst-containing gaseous stream passing into reactor 15 from chamber 11 is combined with a normally gaseous olefinic hydrocarbon charge comprising propylene which is injected into the inlet of reactor 15 through line 21. Introduction of the olefinic charge from line 21 into reactor 23 may comprise the use of a jet, nozzle, perforated ring or similar injection means. The combined gaseous streams, comprising the suspended entrained catalyst, are passed concurrently upward through reactor 15. Effluence from reactor 15, comprising catalyst, reaction products, unconverted hydrocarbon gases and steam, is introduced into cyclone 23. Within cyclone 23, catalyst is separated from reactor effluence and passed through conduit 25 into chamber 11.

Reactor 15 is maintained at a temperature of from about 350° to about 550° C., preferably from about 400° to about 500° C. Pressures in the range of from about atmospheric to about 500 pounds, preferably from about 50 to about 150 pounds, are maintained within reactor 15.

The rate at which steam, oxygen and olefinic charge are introduced into the system is controlled to assure a space velocity at which at least the greater part of the catalyst entrained into reactor 15 is passed therethrough in the suspended state. The specific space velocity maintained through reactor 15 will vary in accordance with the physical characteristics of the catalyst employed and the time of contact used. The time of contact employed may vary within the scope of the invention. Thus, a time of contact in the range of from about 0.05 to 30 seconds, generally from about 0.05 to about 20 seconds, will be found to be satisfactory. Higher or lower times of contact may, however, be employed within the scope of the invention. It is preferred, however, to carry out the reaction with a short contact time, for example, in the range of from about 0.05 to about 10 seconds.

The oxidation of propylene to reaction products comprising acrolein is exothermic. The desired reaction temperature is maintained throughout reactor 15 by the controlled removal of exothermic heat of reaction from the reaction zone and by control of the temperature of catalyst and reactants introduced into reactor 15. This is accomplished primarily by subjecting the hot catalyst in chamber 11 to direct contact with water. When more water needs to be introduced into chamber 11 than is passed thereto through lines 14 and 50, such additional amount of water may be introduced through valved line 13 and optionally by other means not shown in the drawing. In thus removing heat transported to chamber 11 from reactor 15 by means of the catalyst, the catalyst is cooled to a desired temperature while at the same time vaporizing water. Steam necessary for maintaining the catalyst flow through the system, for assuring suspension of catalyst in reactor 15, and for controlling reactor temperature conditions within reactor 15 proper, is thus obtained within the system as a result of the method of heat removal which forms an integral part of the process. Substantial amounts of steam are generally required and the generation of such steam has heretofore constituted a considerable part of the operational cost of carrying out a process of this type. The process of the invention now makes possible considerable reduction in the cost of operating the system by the utilization of the heat of exothermic reaction produced in the system in the manner described.

Additional removal of exothermic heat from reactor 15 is effected by passing a cooling medium, for example, steam condensate taken from drum 25, through one or more of the cooling jackets 16, 17 and 18 by means of valved lines 26, 27 and 29. Steam formed in the cooling jackets is returned to steam drum 25 with the aid of lines 30, 31 and 32. Make-up water is introduced into the system by means of line 33.

A line 43 is provided to enable the introduction of a suitable quenching medium, for example, water into cyclone 23. Hot catalyst leaving cyclone 23 is stripped with steam emanating from drum 25 through valved lines 12 and 35. Such stripping of the catalyst with steam results in the removal of at least a substantial amount of residual organic material therefrom, not only improving efficiency of operation of the reactor but prolonging the effective life of the catalyst.

When required steam may be passed from drum 25 through lines 35, 12 and 10 into chamber 11, to aid in maintaining the desired reaction conditions. Additional steam as needed may be introduced into the system from an outside source by means not shown in the drawing. Steam may also be injected into the reactor 15 at one or more points along the length thereof, for example, through valved lines 39 and 40, and others not shown in the drawing.

A significant advantage inherent in the method of utilizing the exothermic heat of the process as described herein resides in the ability to carry out the process efficiently with the maintenance of a relatively high oxygen concentration, not only at the inlet of reactor 15 but throughout the greater part thereof, without incurring disadvantages attributable to localized overheating and consequent product degradation. Introduction of the oxygen into the system is preferably controlled to maintain a mol ratio of oxygen to olefinic hydrocarbon of at least 0.5:1 and preferably from about 0.8:1 to about 1.5:1. In the process of the present invention oxygen gas in addition to that introduced through line 10 is preferably introduced into the system at a plurality of points along the length of the reaction zone. By the passage of oxygen from line 10 through lines 37 and 38 such additional oxygen is introduced into reactor 15 at a plurality of points thereof. The ability to thus introduce oxygen at a plurality of points along the length of the reaction zone in the process of the invention, without incurring overheating, couples with the relatively rapid reaction rate, enables the desired controlled oxidation of propylene to proceed with unusually high rates of production of the desired acrolein.

Under the above-defined conditions propylene reacts with molecular oxygen in reactor 15 with the formation of reaction products comprising acrolein.

Suitable catalyst storage means, and means to enable the passage of catalyst to and from the system as required, may be provided.

Reactor effluence comprising water vapor, unconverted hydrocarbon gases including propylene, acrolein and some entrained catalyst is passed from cyclone 23, through line 46, provided with indirect heat exchanger 47, into a suitable catalyst slurry separating means, for example, a chamber 48. In passing through indirect heat exchanger 47 the hot reactor effluence is cooled to effect the condensation of at least a part of the water vapor. A slurry of catalyst in water separated in chamber 48 is passed through line 50 and chamber 11. In thus effecting a partial condensation of the reactor effluence in exchanger 48, means are provided for separating the entrained catalyst fines and returning them as a slurry to the reaction zone as described while simultaneously enabling the return of water to chamber 11 necessary for the cooling operation.

Gaseous material, comprising acrolein and unreacted hydrocarbons comprising propylene, is passed from chamber 51, through line 51 provided with indirect heat exchanger 52, into a phase separating chamber 53. In passing through exchanger 52 the stream is cooled to a temperature sufficiently low to effect the condensation of at least a part of the reaction products. Vapor phase, comprising unconverted hydrocarbons and acrolein is passed from phase separator 53, through line 55, into product recovery means comprising an absorber 56. Within absorber 56 charge thereto is brought into contact with an absorbing medium capable of selectively absorbing acrolein, for example water, introduced into the system through line 57 provided with cooler 58. Rich absorbate, consisting essentially of water and reaction products comprising acrolein, is passed from absorber 56 through line 64 into a stripper 65. Liquid phase separated in phase separator 53 is passed therefrom through line 63 into stripper 65. Within stripper 65 a vapor phase comprising acrolein is separated from a liquid phase comprising water. Liquid phase is passed from stripper 65, through lines 68, 14 and 57 into the upper part of absorber 56. Vapor phase comprising acrolein is passed overhead from stripper 65 through line 67 and eliminated from the system as final product. A part of the liquid withdrawn from stripper 75 is passed through lines 68 and 14 into catalyst cooler 11. A valved line 69 is provided for the introduction of water from an outside source into the system.

At least a part of the overhead from absorber 56, comprising hydrocarbons including propylene, is forced through line 60, into the propylene charge line 21. A part of all of the gaseous stream recycled through line 60 may be preheated, for example, by indirect heat exchange with hot reactor effluent flowing through line 46. A part of the overhead from absorber 56 may be bled from the system through valved line 61.

Paraffinic hydrocarbons such as, for example propane, may be included in the hydrocarbon charge to the system. Thus, the process of the invention is applied with advantage to the conversion of the propylene content of available commercial propane-propylene fractions to acrolein.

Although the above detailed description of the invention has been made with reference to the production of acrolein from propylene the invention is in no wise limited thereto as indicated above. Thus, in accordance with the invention olefins of higher molecular weight than propylene are converted to the corresponding alpha, beta- unsaturated aldehydes, etc.; isobutylene is converted to methacrolein, etc.

In a modification of the invention at least a part of the catalyst leaving reactor 15 may be by-passed through a regenerating zone before being introduced into catalyst cooling chamber 11. The catalyst regenerating zone may comprise a chamber provided with conventional means for maintaining the catalyst in fluidized state therein. In the regenerating zone the catalyst may be subjected to suitable conditions comprising, for example, oxidizing conditions, carbon deposit removing conditions, revivification, and the like. Within the regeneration chamber the catalyst may be brought into direct contact with gases comprising one or more such components as oxygen, steam, and the like.

The invention is further illustrated by the following non-limiting example of its execution:

*Example*

Acrolein is produced by oxidizing propylene with molecular oxygen in the presence of a bismuth molybdate catalyst in a riser reactor having a length of 80 feet and an internal diameter of 28.75 inches positioned above a catalyst cooling vessel, substantially as illustrated in the figure of the attached drawing.

The catalyst chamber 11, containing a bed of catalyst consisting essentially of bismuth molybdate on a silica support, and the riser reactor 15 associated therewith, are preheated to a temperature of approximately 420° C. by passing hot flue gas therethrough. Thereupon, oxygen (95% purity) is introduced into the lower part of chamber 11 and passed upwardly through the catalyst therein. Water, emanating at least in part from within the system, is introduced into chamber 11 wherein it is converted to steam. The gaseous stream comprising oxygen and steam and containing entrained catalyst, leaving the catalyst bed in chamber 11 passes upwardly through riser reactor 15 positioned above catalyst chamber 11. Propylene, together with propylene-containing gas recycled from within the system, is introduced into the lower part of reactor 15 and passes upwardly through reactor 15 concurrently with the steam, oxygen and suspended catalyst emanating from catalyst chamber 11. Reactor effluence leaving reactor 15 is introduced into cyclone 23 wherein catalyst is separated from the gaseous components. Water is introduced into cyclone 23 to reduce the reactor effluence to a temperature of about 290° C. Hot catalyst separated in cyclone 23 is passed to catalyst chamber 11. Reactor effluence, now freed of most of the entrained catalyst, is subjected to indirect heat exchange to effect the condensation of the greater part of the steam content thereof, thereby forming an aqueous slurry containing substantially all of any remaining entrained catalyst. The aqueous slurry so formed is introduced into catalyst chamber 11. The reactor effluence remaining after separation of the catalyst and most of the water content therefrom is passed to the product recovery system. The reaction mixture passing upwardly into riser reactor 15 will contain about 7.5 mol percent oxygen, about 21.5% mol propylene and about 38% mol steam; the rest will consist essentially of nitrogen, oxygen, oxides of carbon, etc. The reactor 15 is maintained at a temperature of about 435° C. Pressure within reactor 15 and in catalyst chamber 11 is maintained at about 90 p.s.i.g. Additional oxygen is injected into reactor 15 at a plurality of points along the length thereof. The additional oxygen so injected into the reactor is equivalent to about 70 mol percent of the total olefin charge to the reactor 15. The reaction mixture will pass through reactor 15 at a velocity of about 20–25 feet per second; the catalyst circulation rate being about 90–100 pounds per second. The reaction temperature is maintained by introduction of water into catalyst chamber 11 and also by contacting the reactor walls with water. The steam generated in contacting the reactor walls with water is used in part to strip the catalyst passing from the cyclone 23 to chamber 11. Another part of such steam is introduced, when necessary, into the lower part of chamber 11 to assist in maintaining the desired conditions. The rate of introduction of reactant and water into the system is controlled to maintain the catalyst in chamber 11 in the fluidized state and the catalyst flowing through reactor 15 in the suspended state throughout the oxidation operation. In the recovery system of the process the reactor effluence freed of catalyst and most of the water is scrubbed with water to selectively absorb acrolein. Acrolein is distilled from the rich aqueous absorbate as a final product. The residual gas from the scrubbing operation is recycled to the inlet of the reactor 15. In this wise a yield of acrolein of about 71% with an oxygen conversion of about 91% and a propylene conversion of about 50% will be obtained.

I claim as my invention:

1. In the process for the production of alpha,beta-unsaturated aldehydes and ketones wherein a preferred suspension of a heavy metal-containing oxidation catalyst selected from the group consisting of oxygen containing compounds of molybdenum, tellurium oxide in combination with an oxide of a group VI metal, copper oxide in combination with a metal of the palladium-platinum group and copper in combination with silica gel, in a molecular oxygen-containing gas and an olefinic hydrocarbon having from three to four carbon atoms are passed concurrently and upwardly through an elongated externally cooled reaction zone of restricted cross-sectional area at unsaturated aldehyde and ketone forming conditions of temperature in the range of from about 250 to about 750° C., and at a space velocity sufficiently high to maintain said catalyst in suspended state throughout its passage through said reaction zone, and alpha,beta-unsaturated aldehydes and ketones and catalyst are separated from the effluence from said reaction zone, the steps of passing said catalyst separated from said reaction zone effluence while still at an elevated temperature into a catalyst cooling zone of enlarged cross-sectional area which is in open communication with said reaction zone, bringing liquid water and a continuous stream of molecular oxygen-containing gas into direct contact with said catalyst in said catalyst cooling zone, thereby generating steam in said catalyst cooling zone while forming a catalyst-containing gaseous effluence from said catalyst cooling zone consisting essentially of molecular oxygen-containing gas, steam and entrained suspended catalyst, passing said suspended catalyst-containing gaseous effluence from said catalyst cooling zone into and through said reaction zone, and introducing said olefinic hydrocarbon into said suspended catalyst-containing gaseous effluence emanating from said catalyst cooling zone substantially at the inlet of said reaction zone.

2. The process in accordance with claim 1 wherein oxygen-containing gas is injected into said reaction zone at a plurality of points along the length thereof.

3. In the process for the production of acrolein wherein a preformed suspension of molybdenum oxide-containing oxidation catalyst in a molecular oxygen-containing gas and propylene are passed concurrently and upwardly through an elongated externally cooled reaction zone of restricted cross-sectional area at a temperature of from about 350° to about 550° C., at a space velocity sufficiently high to maintain said catalyst in the suspended state throughout its passage through said reaction zone and catalyst and acrolein are separated from the effluence from said reaction zone, the steps of passing said catalyst separated from said reaction zone effluence while still at an elevated temperature into a catalyst cooling zone of enlarged cross-sectional area which is in open communication with said reaction zone, bringing liquid water and a continuous stream of molecular oxygen-containing gas into direct contact with said catalyst in said catalyst cooling zone, thereby generating steam in said catalyst cooling zone while forming a catalyst-containing gaseous effluence from said catalyst cooling zone consisting essentially of molecular oxygen-containing gas, steam and entrained suspended catalyst, passing said suspended catalyst-containing gaseous effluence from said catalyst cooling zone into and through said reaction zone, and introducing propylene into said suspended catalyst-containing gaseous effluence emanating from said catalyst cooling zone substantially at the inlet to said reaction zone.

4. In the process for the production of acrolein wherein a preformed suspension of a heavy metal-containing oxidation catalyst consisting essentially of an oxygen-containing compound of molybdenum in a molecular oxygen-containing gas and propylene are passed concurrently and upwardly through an elongated externally cooled reaction zone of restricted cross-sectional area at a temperature of from about 350° to about 550° C., at a space velocity sufficiently high to maintain said catalyst in the suspended state throughout its passage through said reaction zone and catalyst and acrolein are separated from the effluence from said reaction zone, the steps of passing said catalyst separated from said reaction zone effluence while still at an elevated temperature into a catalyst cooling zone of enlarged cross-sectional area which is in open communication with said reaction zone, bringing liquid water and a continuous stream of molecular oxygen into direct contact with said catalyst in said catalyst cooling zone, thereby generating steam in said catalyst cooling zone while forming a catalyst-containing gaseous effluence from said catalyst cooling zone consisting essentially of molecular oxygen, steam and entrained suspended catalyst, passing said suspended catalyst-containing gaseous effluence from said catalyst cooling zone into and through said reaction zone, introducing propylene into said suspended catalyst-containing gaseous effluence emanating from said catalyst cooling zone substantially at the inlet to said reaction zone, and injecting molecular oxygen into said reaction zone at a plurality of points along the length thereof.

5. The process in accordance with claim 4 wherein reaction zone effluence comprising acrolein, steam, propylene and entrained catalyst is subjected to cooling by indirect heat exchange, thereby separating a liquid phase consisting essentially of aqueous catalyst slurry, and said aqueous catalyst slurry is passed into said catalyst cooling zone of enlarged cross-sectional area.

References Cited in the file of this patent

UNITED STATES PATENTS

| 2,517,006 | MacLean | Aug. 1, 1950 |
| 2,941,007 | Callahan | June 14, 1960 |

FOREIGN PATENTS

| 821,999 | Great Britain | Oct. 14, 1959 |